(12) United States Patent
Ishida

(10) Patent No.: US 7,726,761 B2
(45) Date of Patent: Jun. 1, 2010

(54) PATTERN FORMING METHOD, DROPLET EJECTING DEVICE, AND ELECTRO-OPTIC DEVICE

(75) Inventor: Kohei Ishida, Suwa (JP)

(73) Assignee: Seiko Epson Corporation (JP)

( * ) Notice: Subject to any disclaimer, the term of this patent is extended or adjusted under 35 U.S.C. 154(b) by 323 days.

(21) Appl. No.: 11/971,935

(22) Filed: Jan. 10, 2008

(65) Prior Publication Data

US 2008/0170092 A1   Jul. 17, 2008

(30) Foreign Application Priority Data

Jan. 15, 2007 (JP) .............................. 2007-005463

(51) Int. Cl.
    *B41J 2/25* (2006.01)
(52) U.S. Cl. .......................................... 347/13; 347/12
(58) Field of Classification Search .................. 347/12, 347/13, 15, 43, 40; 438/21, 28, 274, 589, 438/784
    See application file for complete search history.

(56) References Cited

U.S. PATENT DOCUMENTS

| 6,443,554 | B1 | 9/2002 | Yoshida |
| 6,663,222 | B2 | 12/2003 | Verhoest et al. |
| 6,692,095 | B1 | 2/2004 | Marumoto et al. |
| 6,737,287 | B1 * | 5/2004 | Furuse et al. ................. 438/21 |
| 7,306,323 | B2 * | 12/2007 | Silverbrook ................. 347/42 |
| 7,393,081 | B2 * | 7/2008 | Maekawa et al. ............. 347/40 |

| 2006/0176335 | A1 | 8/2006 | Chung et al. |
| 2007/0153216 | A1 | 7/2007 | Kim |

FOREIGN PATENT DOCUMENTS

| JP | 11-72612 | 3/1999 |
| JP | 2001-18387 | 1/2001 |
| JP | 2002-210937 | 7/2002 |
| JP | 2004-255335 | 9/2004 |
| JP | 2004-314352 | 11/2004 |
| JP | 2005-95835 | 4/2005 |
| JP | 2005-334781 | 12/2005 |
| JP | 2006-216532 | 8/2006 |
| JP | 2007-183548 | 7/2007 |

* cited by examiner

*Primary Examiner*—Lamson D Nguyen
(74) *Attorney, Agent, or Firm*—Harness, Dickey & Pierce, P.L.C.

(57) ABSTRACT

A pattern forming method includes: disposing a portion of a first nozzle group composed of a plurality of first nozzles arranged in a first direction and a portion of a second nozzle group composed of a plurality of second nozzles arranged in the first direction so as to overlap each other as viewed in a second direction; and ejecting a droplet from each of a plurality of selected nozzles of the first nozzles and a plurality of selected nozzles of the second nozzles to a substrate that moves in the second direction relative to the first nozzles and the second nozzles to form a pattern on the substrate. A droplet is ejected from each of a plurality of the first nozzles selected in an area of the first nozzle group overlapped with the second nozzle group as viewed in the second direction and each of the plurality of second nozzles located between each adjacent pair of the selected first nozzles as viewed in the second direction is selected to eject a droplet.

11 Claims, 10 Drawing Sheets

PATTERN FORMING METHOD, DROPLET EJECTING DEVICE, AND ELECTRO-OPTIC DEVICE

BACKGROUND OF THE INVENTION

1. Technical Field

The present invention relates to a method of forming a pattern, to a droplet ejecting device, and to an electro-optic device.

2. Related Art

A liquid crystal display device includes a rubbing-processed oriented film on an inner side surface of a substrate to which liquid crystal is filled to specify the alignment state of liquid crystal molecules. In the production process of oriented films, an ink-jet method using a droplet ejecting device is employed to increase productivity and reduce a production cost.

The droplet ejecting device includes an ejecting head which relatively moves with respect to the substrate and a plurality of nozzles that are arrayed in one direction of the ejecting head. The droplet ejecting device causes a nozzle it has selected to eject a droplet, while relatively moving the ejecting head and the substrate along the main scanning direction. Next, the droplet ejecting device form an oriented film by drawing a pattern composed of a liquid body along the main scanning direction of the substrate and drying the pattern.

Meanwhile, the ink-jet method as described above ejects a droplet toward the entire range of a film pattern. Accordingly, when the size of the film pattern increases, a new line of the scan path of the ejecting head must be created for a plurality of times. At this time, a droplet ejected by a preceding scan starts drying earlier than a droplet ejected by a subsequent scan. As a result, a difference in flowability is generated between a liquid body corresponding to the preceding scan path and a liquid body corresponding to the subsequent scan path, and thus stripe-like difference in the film thickness which is consecutive in the main scanning direction (referred to, hereinafter, as simply a stripe unevenness) is formed in the boundary between the scan paths.

Therefore, for the ink-jet method, proposals for resolving stripe unevenness as described above have been conventionally made. Arts disclosed in JP-A-2004-255335 and JP-A-2005-95835 dispose a plurality of ejecting heads along a direction which intersects with the main scanning direction. Each droplet ejecting device scans the substrate toward the plurality of ejecting heads only once, and eject droplets from a plurality of ejecting heads toward the substantially entire substrate. This eliminates new line scanning of the ejecting head, and thereby resolving stripe unevenness caused by new line scanning.

The ejecting head as described above is generally formed into a rectangle extending along the direction in which nozzles are arrayed. The ejecting head has a dead space where nozzles cannot be arrayed at the end portion in the alignment direction thereof. Examples of the dead space include a space for input terminals for driving an actuator and a space for securing machining accuracy of nozzles. In the case where such ejecting heads are provided in parallel along the direction in which the ejecting heads are arrayed, the ejecting heads cannot eject droplets on the scan path of each dead space. As a result, new line scanning is necessary for a plurality of times.

The arts disclosed in JP-A-2004-255335 and JP-A-2005-95835 dispose the ejecting heads in a staggered-like manner and a step-like manner, and dispose a part of each of nozzle lines of adjacent ejecting heads in the scanning direction of each dead space. This enables overlapping the scan path of the dead space with the scan path of the nozzle line, thereby enabling eliminating new line scanning caused by a dead space.

However, the arts in JP-A-2004-255335 and JP-A-2005-95835 dispose each of the nozzle lines in the main scanning direction or the reverse main scanning direction of the adjacent nozzle lines. Accordingly, a time difference in ejection timing of a droplet is generated at the boundary between the scan paths of the adjacent nozzle lines. Since the size of the droplet that strikes the substrate is from several ng to several tens of ng, the time difference in such ejection timing makes a large difference in a dried state. As a result, in the arts disclosed in JP-A-2004-255335 and JP-A-2005-95835, stripe unevenness is generated at the boundary between the adjacent ejecting heads, and whereby display quality of the liquid crystal display device is deteriorated.

SUMMARY

An advantage of the present invention is to provide a pattern forming method, a droplet ejecting device and an electro-optic device in which the boundary of the film patterns formed by droplets that strike at different timing is made consecutive.

According to a first aspect of the invention, a pattern forming method includes: disposing a portion of a first nozzle group composed of a plurality of first nozzles arranged in a first direction and a portion of a second nozzle group composed of a plurality of second nozzles arranged in the first direction so as to overlap each other as viewed in a second direction; and ejecting a droplet from each of a plurality of selected nozzles of the first nozzles and a plurality of selected nozzles of the second nozzles to a substrate that moves in the second direction relative to the first nozzles and the second nozzles to form a pattern on the substrate. A droplet is ejected from each of a plurality of the first nozzles selected in an area of the first nozzle group overlapped with the second nozzle group as viewed in the second direction and each of the plurality of second nozzles located between each adjacent pair of the selected first nozzles as viewed in the second direction is selected to eject a droplet.

According to the method of the first aspect, film patterns which are formed at different timings can be disposed repeatedly in the first direction in a region where film patterns which are formed at different timings are joined with each other. Therefore, the boundary of the film patterns which are formed at different timings can be dispersed, and the entire film pattern can be formed consecutively.

In this case, a droplet is ejected from a plurality of the first nozzles selected in accordance with a predetermined interval in the area of the first nozzle group overlapped with the second nozzle group as viewed in the second direction, and a plurality of the second nozzles located between each adjacent pair of the selected first nozzles as viewed in the second direction is selected to eject a droplet.

According to the method of the first aspect, film patterns which are formed at different timings can be disposed regularly and repeatedly along the first direction at a predetermined interval in a region where film patterns which are formed at different timings are joined with each other. As a result, the film pattern formed by ejecting droplets can be formed consecutively with more certainty.

In this case, at least a pair of a first nozzle and a second nozzle that overlap each other as viewed in the second direction is alternately selected to eject a droplet.

According to the method of the first aspect, film patterns which are formed at different timings can be disposed repeatedly in the second direction in a region where film patterns which are formed at different timings are joined with each other. Therefore, the boundary of the film patterns which are formed at different timings can be further dispersed, and the entire film pattern can be formed more consecutively.

In this case, a foremost position in the first direction of the first nozzles selected in the area of the first nozzle group overlapped with the second nozzle group as viewed in the second direction is shifted at a predetermined cycle.

According to the method of the first aspect, film patterns which are formed at different timings can be disposed repeatedly in a direction which intersects with the first direction and which intersects with the second direction. Therefore, the boundary of the film patterns which are formed at different timings can be further dispersed, and the entire film pattern can be formed more consecutively.

According to a second aspect of the invention, a pattern forming method includes: disposing a portion of a first nozzle group composed of a plurality of first nozzles arranged in a first direction and a portion of a second nozzle group composed of a plurality of second nozzles arranged in the first direction so as to overlap each other as viewed in a second direction; and ejecting a droplet from each of a plurality of selected nozzles of the first nozzles and a plurality of selected nozzles of the second nozzles to a substrate that moves in the second direction relative to the first nozzles and the second nozzles to form a pattern on the substrate. At least a pair of a first nozzle and a second nozzle that overlap each other as viewed in the second direction is alternately selected to eject a droplet.

According to the method of the second aspect, film patterns which are formed at different timings can be disposed repeatedly in the second direction in a region where film patterns which are formed at different timings are joined with each other. Therefore, the boundary of the film patterns which are formed at different timings can be dispersed, and the entire film pattern can be formed consecutively.

In this case, at least a pair of a first nozzle and a second nozzle that overlap each other as viewed in the second direction is alternately selected at a predetermined cycle to eject a droplet.

According to the method of the second aspect, film patterns which are formed at different timings can be disposed regularly and repeatedly along the second direction at a predetermined interval in a region where film patterns which are formed at different timings are joined with each other. As a result, the film pattern formed by ejecting droplets can be formed more consecutively.

In this case, consecutive nozzles of the first nozzles arranged in the first direction in the area of the first nozzle group overlapped with the second nozzle group as viewed in the second direction, and consecutive nozzles of the second nozzles arranged in the first direction in the area of the second nozzle group overlapped with the first nozzle group as viewed in the second direction are alternately selected at a predetermined cycle to eject a droplet.

According to the method of the second aspect, film patterns which are formed at different timings and consecutive in the first direction can be disposed repeatedly in the second direction in a region where film patterns which are formed at different timings are joined with each other. Therefore, the boundary of the film patterns which are formed at different timings can be dispersed along both the first direction and the second direction, and the entire film pattern can be formed consecutively.

In this case, a foremost position in the first direction of the first nozzles selected in the area of the first nozzle group overlapped with the second nozzle group as viewed in the second is shifted at a predetermined cycle.

According to the method of the second aspect, film patterns which are formed at different timings can be disposed repeatedly in a direction which intersects with the first direction and which intersects with the second direction. Therefore, the boundary of the film patterns which are formed at different timings can be further dispersed, and the entire film pattern can be formed more consecutively.

According to a third aspect of the invention, a droplet ejecting device includes: a head unit including a first nozzle group composed of a plurality of first nozzles arranged in a first direction and a second nozzle group composed of a plurality of second nozzles arranged in the first direction, a portion of the first nozzle group and a portion of the second nozzle group being disposed so as to overlap each other as viewed in a second direction, a moving unit that relatively moves the head unit and a substrate in the second direction; and a control unit that selects a plurality of nozzles of the first nozzles in an area of the first nozzle group overlapped with the second nozzle group as viewed in the second direction, produces selection data for selecting the second nozzles located between each adjacent pair of the selected first nozzles as viewed in the second direction, and selectively drives each of the first nozzles and the second nozzles based on the selection data to eject a droplet to the substrate.

According to the device of the third aspect, the control unit can dispose film patterns which are formed at different timings repeatedly in the first direction in a region where film patterns which are formed at different timings are joined with each other. Therefore, the control unit can disperse the boundary of the film patterns which are formed at different timings, and can form the entire film pattern consecutively.

According to a fourth aspect of the invention, a droplet ejecting device includes: a head unit including a first nozzle group composed of a plurality of first nozzles arranged in a first direction and a second nozzle group composed of a plurality of second nozzles arranged in the first direction, a portion of the first nozzle group and a portion of the second nozzle group being disposed so as to overlap each other as viewed in a second direction, a moving unit that relatively moves the head unit and a substrate in the second direction; and a control unit that produces selection data for alternately selecting at least a pair of a first nozzle and a second nozzle that overlap each other as viewed in the second direction, and selectively drives each of the first nozzles and the second nozzles based on the selection data to eject a droplet to the substrate.

According to the device of the fourth aspect, the control unit can dispose film patterns which are formed at different timings repeatedly in the second direction in a region where film patterns which are formed at different timings are joined with each other. Therefore, the control unit can disperse the boundary of the film patterns which are formed at different timings, and can form the entire film pattern consecutively.

According to a fifth aspect of the invention, an electro optic device includes an oriented film on a side surface of a substrate. The oriented film is formed by the droplet ejecting device of the fourth aspect. According to the device of the fifth aspect, stripe unevenness can be reduced for the entire oriented film.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
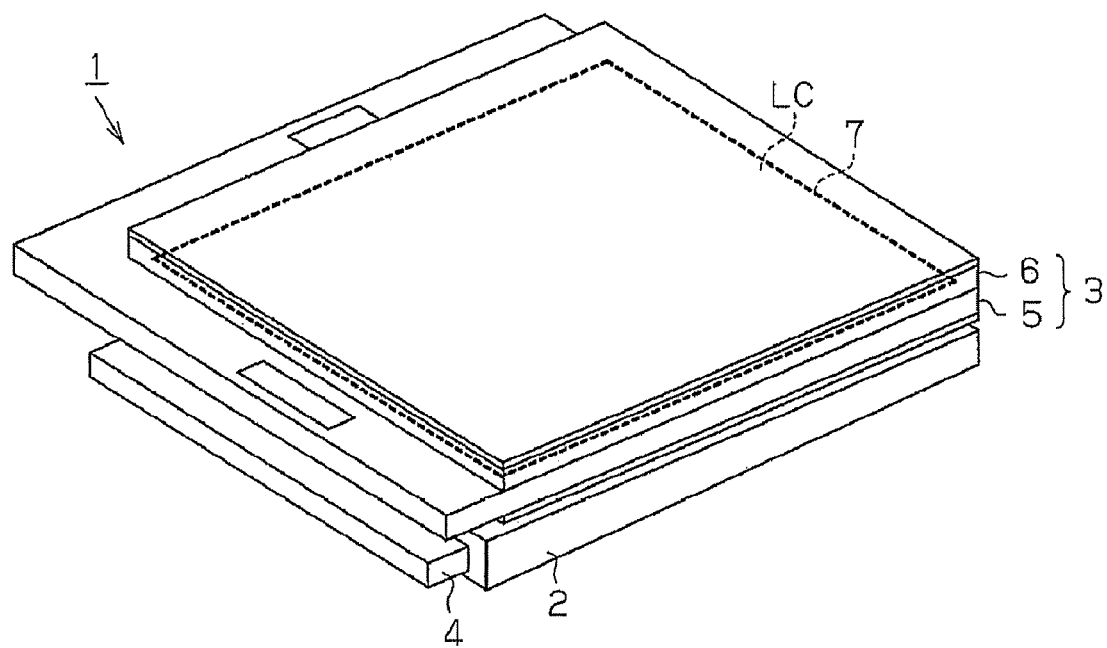
FIG. 1 is a perspective view showing a liquid crystal display device.

First Embodiment of the present invention will be described, with reference to FIG. 1 to FIG. 9. First, a liquid crystal display device 1 as an electro-optic device will be described. FIG. 1 a perspective view showing an entire liquid crystal display device, and FIG. 2 is a perspective view of an oriented film provided in the liquid crystal display device.

In FIG. 1, the liquid crystal display device 1 includes a backup light 2 and a liquid crystal panel 3. The backup light 2 irradiates light emitted from the light source 4 to the entire surface of the liquid crystal panel 3. The liquid crystal panel 3 includes an element substrate 5 and a color filter substrate 6. The element substrate 5 and the color filter substrate 6 are adhered to each other by a seal member 7 having a square frame shape, and a liquid crystal LC is filled in a gap therebetween. The liquid crystal LC modulates light from the backup light 2 to display an image as desired on the upper surface of the color filter substrate 6.

Figure 2:
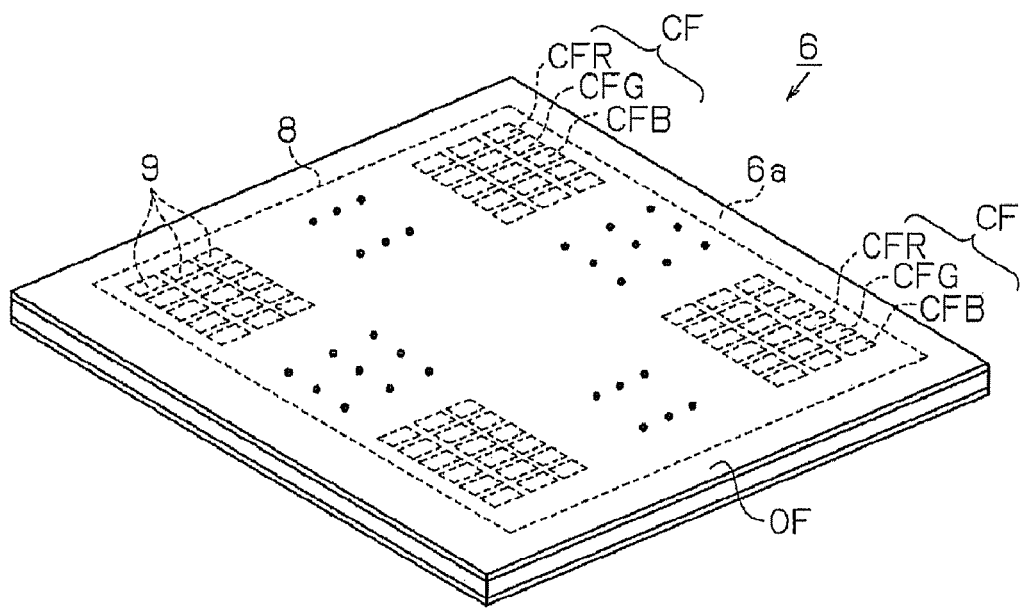
FIG. 2 is a perspective view showing a color filter substrate.

In FIG. 2, a lattice-like light shielding layer 8 and a number of spaces (pixels 9) surrounded by the light shielding layer 8 are formed on the upper surface of the color filter substrate 6 (the bottom surface of FIG. 1: the side surface opposed to the element substrate 5). The light shielding layer 8, formed of a resin containing light shielding material such as chromium and carbon black, shields light transmitted by the liquid crystal LC. Each of the pixels 9 includes a color filter CF which transmits light at a particular wavelength. The color filter CF is composed of, for example, a red filter CFR which transmits red light, a green filter CFG which transmits green light, and a blue filter CFB which transmits blue light.

An oriented film OF is formed on the upper side of the color filter CF. The oriented film OF covers the entire surface of the color filter substrate 6 and makes contact with the liquid crystal LC. The oriented film OF is a thin film formed of oriented polymers such as highly-oriented polyimide. The oriented film OF has been subjected to alignment process such as a rubbing process so as to specify the alignment state of liquid crystal molecules that make contact with the oriented film. The oriented film OF is formed utilizing the droplet ejecting device according to the present invention. Specifically, the oriented film OF is formed by making an oriented film material containing highly-oriented polymers (referred to, hereinafter, as simply an ink for oriented film Ik) to a number of droplets, ejecting the droplets to the substantially entire surface of the color filter substrate 6, and drying a number of droplets that has struck the substrate.

Figure 3:
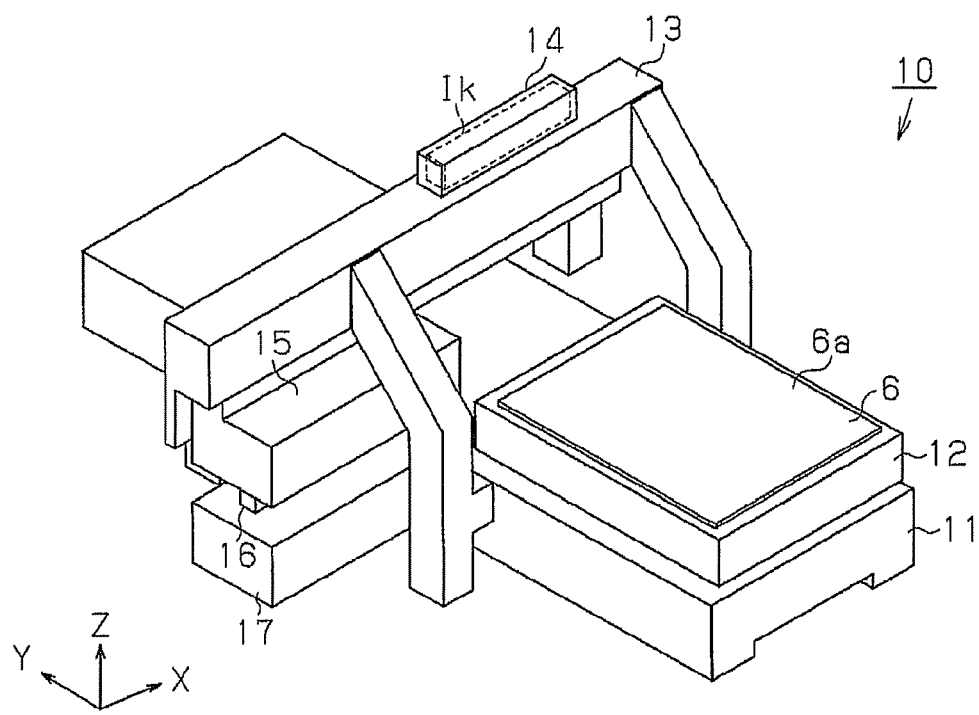
FIG. 3 is a perspective view showing a droplet ejecting device.
Figure 4:
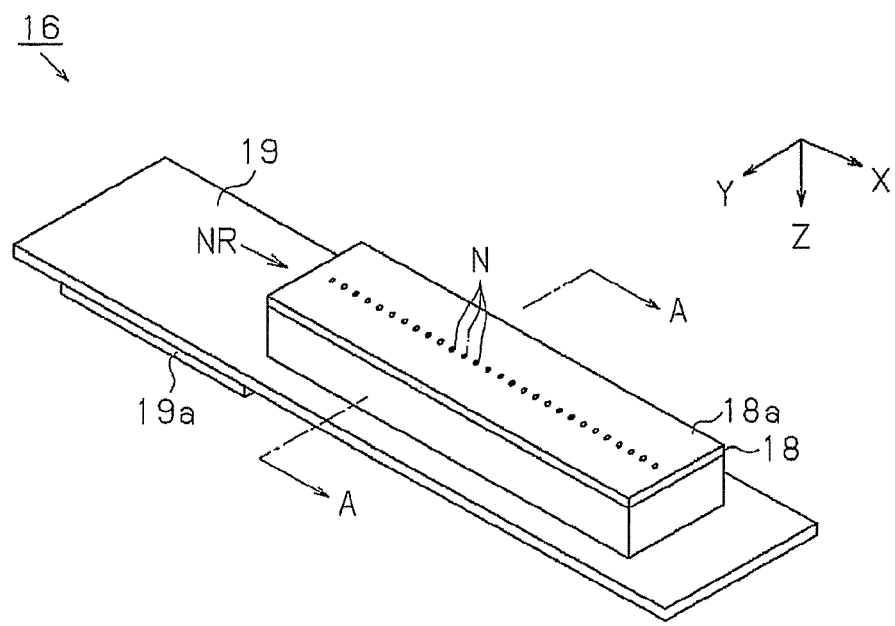
FIG. 4 is a perspective view showing an ejecting head.
Figure 5:
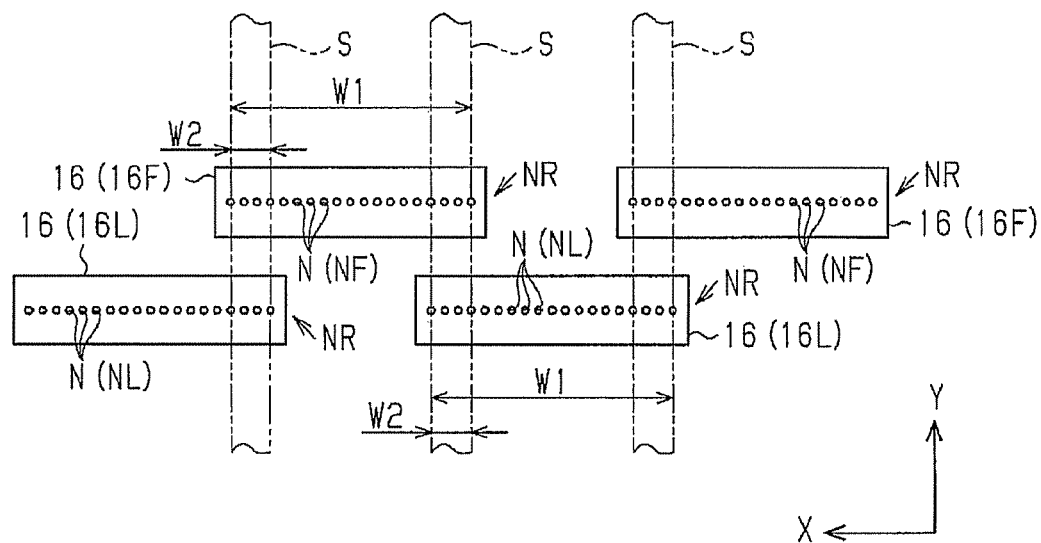
FIG. 5 is a plan view showing a layout of the ejecting heads.
Figure 6:
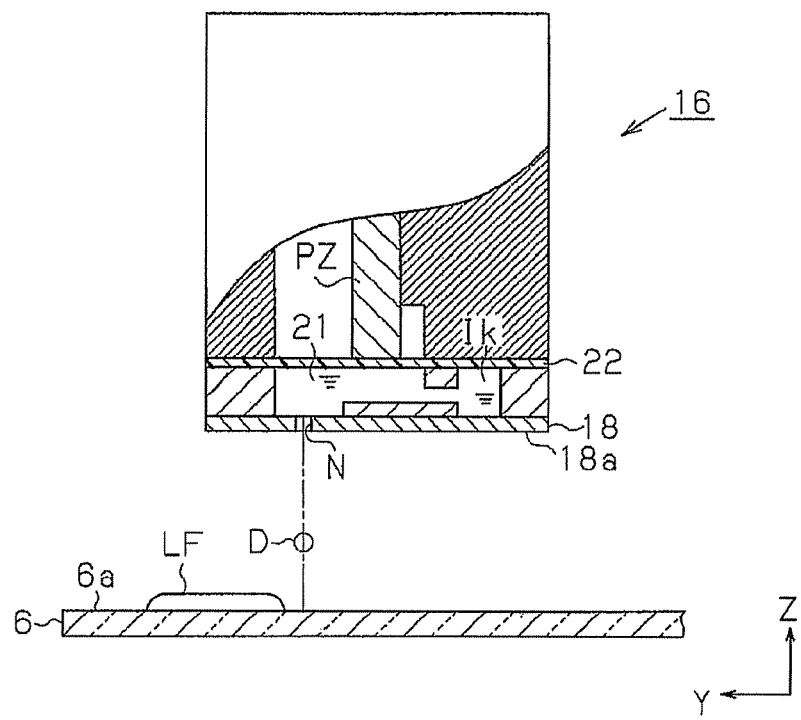
FIG. 6 is a partial cross-sectional view showing an internal configuration of the ejecting head.

The droplet ejecting device for forming the oriented film OF as described above will now be described. FIG. 3 and FIG. 4 are perspective views that show the entire droplet ejecting device and the entire ejecting head, respectively. FIG. 5 and FIG. 6 are a plan view and a cross-sectional side view that schematically show the layout of the ejecting head and the inside of the ejecting head, respectively.

In FIG. 3, a droplet ejecting device 10 includes a base 11 formed into a rectangle. A substrate stage 12 is attached on the upper surface of the base 11. The substrate stage 12 is driven by and connected to the output shaft of the stage motor provided on the base 11. The color filter substrate 6 is placed on the substrate stage 12 in the state where the ejection surface 6a faces upward, and the substrate stage 12 fixes the position of the color filter substrate 6. When the stage motor is rotated in the normal or reverse direction, the substrate stage 12 reciprocates at a predetermined rate along the main scanning direction (arrow Y direction), and scans the color filter substrate 6 along the main scanning direction.

A guiding component 13 formed into a gate shape is erected over the base 11 along the sub scanning direction (the arrow X direction) that is perpendicular to the arrow Y direction, and an ink tank 14 is set on the upper side of the guiding component 13. The ink tank 14 stores the ink for oriented film Ik as described above and discharges the ink for oriented film Ik at a predetermined pressure.

A carriage 15 is attached below the guiding component 13. The carriage 15 is driven by and connected to the output shaft of the carriage motor provided in the guiding component 13. A plurality of ejecting heads 16 are disposed along the sub scanning direction below the carriage 15. When the carriage motor is rotated in the normal or reverse direction, the carriage 15 reciprocates along the sub scanning direction, and scans each of the ejecting heads 16 along the sub scanning direction.

A maintenance mechanism 17 is set to the left of the base 11. The maintenance mechanism 17 is used to stabilize the ejection state of the ejecting heads 16 when cleaning or flushing the ejecting heads 16.

In FIG. 4, a nozzle plate 18 is provided on the upper side of each ejecting head 16. A nozzle forming surface 18a which is parallel with the color filter substrate 6 is formed on the upper surface of the nozzle plate 18. One hundred and eighty nozzles N that penetrate in the normal line direction of the nozzle forming surface 18a are arrayed along the sub scanning direction (the arrow X direction) of the ejecting head 16 at an equal interval on the nozzle forming surface 18a. The nozzles N form a single nozzle line NR that serves as the nozzle group. A head substrate 19 is provided on the bottom side of the ejecting head 16, and an internal terminal 19a is provided at one side end of the head substrate 19. A predetermined drive waveform signal is inputted to the internal terminal 19a for driving the ejecting head 16.

In FIG. 5, a plurality of the ejecting heads 16 are disposed along the sub scanning direction respectively, in a staggered-like manner. Herein, each of the plurality of ejecting heads 16 that are disposed in the reverse main scanning direction is referred to as a preceding ejecting head 16L. The nozzle N each preceding ejecting head 16L has is referred to as a preceding nozzle NL that serves as a first nozzle. In addition, each of the plurality of ejecting heads 16 disposed in the main scanning direction is referred to as a subsequent ejecting head 16F. The nozzle N each subsequent ejecting heads 16F has is referred to as a subsequent nozzle NF which serves as a second nozzle. In FIG. 5, for the convenience of describing the layout of the ejecting heads 16, a simplified number of the nozzles N are shown.

The preceding ejecting head 16L and the subsequent ejecting heads 16F that are adjacent to each other are disposed such that the nozzle lines NR of both partially overlap with each other at a predetermined proportion when viewed from the main scanning direction. In addition, in a region where the nozzle lines NR overlap with each other, the preceding nozzle NL and the subsequent nozzle NF are disposed at a substantially same position when viewed from the main scanning direction.

Herein, the width of the nozzle line NR is referred to as a nozzle line width W1. The overlapping width of the adjacent nozzle lines NR is referred to as an overlap width W2. Also, the ratio of the overlapping width W2 with respect to the nozzle line width W1 is referred to as an "overlap rate". The overlap rate is preferably 5 to 40% to reduce stripe unevenness of the oriented film OF. If the overlap rate becomes smaller than 5%, formation of stripe unevenness is started between the oriented film OF formed by the preceding nozzle NL and the oriented film OF formed by the subsequent nozzle NF. On the other hand, if the overlap rate becomes greater than 40%, overlapping between the preceding ejecting head 16L and the subsequent ejecting head 16F increases. As a result, the number of the ejecting heads 16 need be substantially increased.

When the color filter substrate 6 is scanned along the main scanning direction, each of the subsequent ejecting heads 16F draws a scan path which overlaps with the scan path of the adjacent preceding ejecting head 16L by the amount equivalent to the overlap rate, so as to compensate the region between the scan paths of the adjacent preceding ejecting heads 16L. As a result, a belt-shaped overlap region S which has the overlap width W2 and which extends in the main scanning direction is formed on the ejection surface 6a. The overlap region S serves as the region where the scan path of the preceding ejecting head 16L and the scan path of the subsequent ejecting head 16F overlaps with each other.

In FIG. 6, a cavity 21 communicating with the ink tank 14 is formed over each nozzle N. Each cavity 21 stores the ink for oriented film Ik discharged by the ink tank 14 and supplies it to the corresponding nozzle N. A diaphragm 22 which is capable of vibrating in the vertical direction is adhered to the upper side of each cavity 21, enabling increasing and decreasing the volume of the corresponding cavity 21. A piezoelectric element PZ is set on the upper side of the diaphragm 22. When the drive waveform signal for driving the piezoelectric element PZ is inputted the piezoelectric element PZ, the piezoelectric element PZ contracts and expands in the vertical direction to vibrate the corresponding diaphragm 22.

When the corresponding diaphragm 22 is vibrating, each cavity 21 vibrates meniscus of the corresponding nozzle N in the vertical direction and ejects the ink for oriented film Ik of the weight corresponding to the drive waveform signal as a droplet D from the corresponding nozzle N. Each ejected droplet D flies along a substantial normal line of the color filter substrate 6, and strikes on the ejection surface 6a opposed to the nozzle N. The droplets D which have struck gather together on the ejection surface 6a, thereby forming a liquid film LF which spreads over the entire pixel 9. The solvent or the carrier fluid from the liquid film LF formed on the ejection surface 6a is evaporated by a predetermined drying process so as to form the oriented film OF.

Herein, the droplet D ejected from the preceding nozzle NL is referred to as "a preceding droplet", and the oriented film OF formed by the preceding droplet is referred to as "a preceding oriented film". In addition, the droplet D ejected from the subsequent nozzle NF is referred to as a "subsequent droplet", and the oriented film OF formed by the subsequent droplet is referred to as a "subsequent oriented film".

Figure 7:
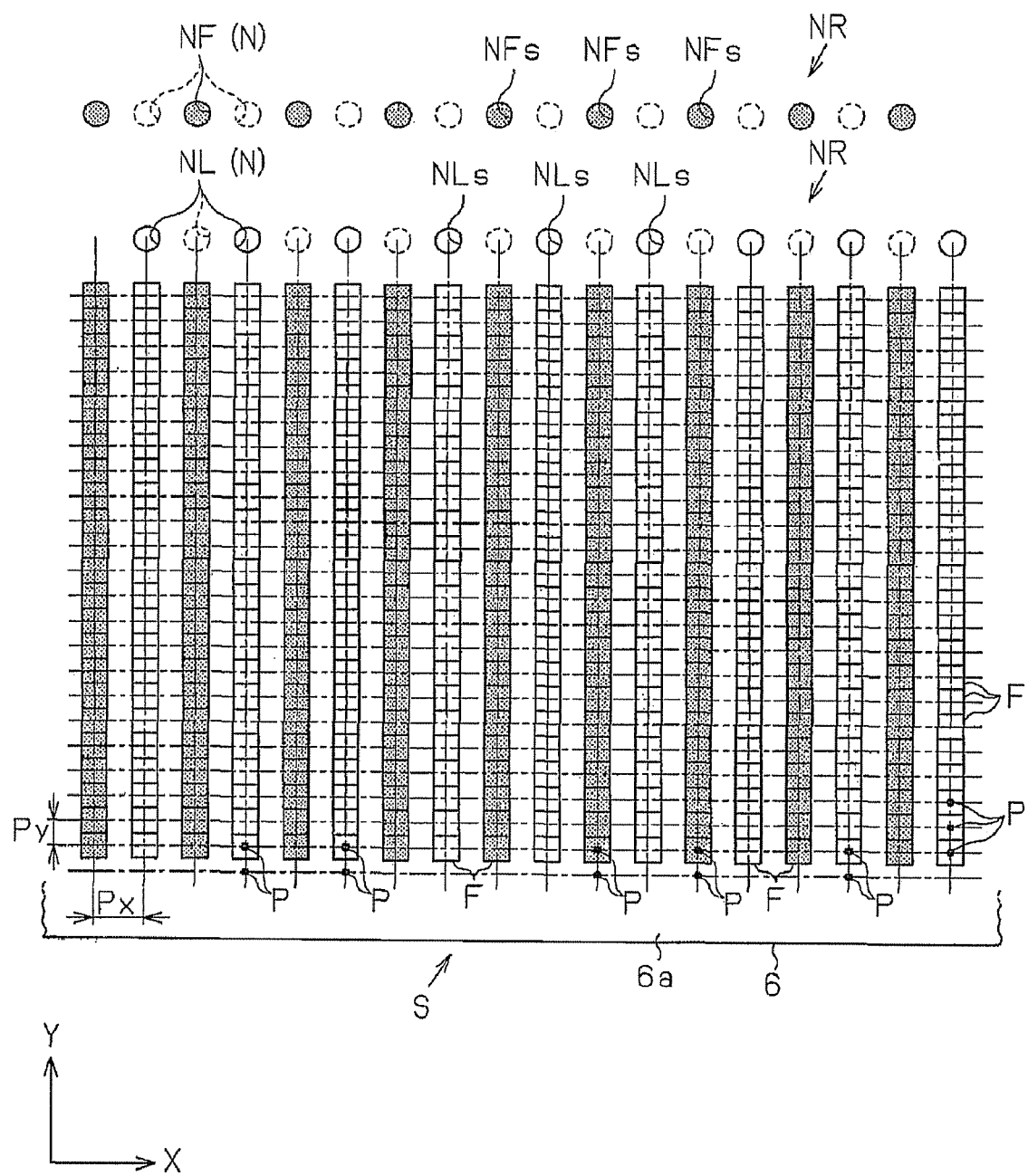
FIG. 7 is a plan view schematically showing a positional relationship between the ejection positions and the nozzles.

FIG. 7 is a diagram schematically showing the ejection positions of the droplets D specified on the ejection surface 6a and the nozzles N associated with the respective ejection positions (referred to, hereinafter, as simply a dot pattern). In FIG. 7, the right side of the ejection surface 6a corresponds to the scan region of the preceding ejecting heads 16L, and the left side of the ejection surface 6a corresponds to the scan region of the subsequent ejecting heads 16F.

In FIG. 7, the ejection surface 6a is virtually divided by a dot pattern grid indicated by a chain line. The dot pattern grid refers to a grid specified by an ejection pitch Py in the main scanning direction and an ejection pitch Px in the sub scanning direction. Whether or not to eject the droplet D is specified for a grid point P of the dot pattern grid.

Among all grid points P, each of the grid points P specified as the ejection position is surrounded by a square frame (referred to, hereinafter, as simply an ejection frame F). The nozzles N for which the ejection operation to the ejection frames F with gradation has been selected are indicated with similar gradation. Meanwhile, the nozzles N for which the ejection operation to the ejection frames F on a colored background has been selected are indicated on a colored background in a similar manner. The nozzles N for which the ejection operation has been selected are indicated by a solid line, and the nozzles N for which the ejection operation has not been selected are indicated by a dotted line. Note that the preceding nozzle NL for which the ejection operation has been selected is referred to as a preceding selected nozzle NLs and the subsequent nozzle NF for which the ejection operation has been selected is referred to as a subsequent selected nozzle NFs.

As shown in FIG. 7, the nozzle N which ejects the droplet D is selected from each grid point P, and is specified to be the nozzle N which passes over the corresponding grid point P. In other words, at each grid point P of the overlap region S, the nozzle N which ejects the droplet D is selected to either the preceding nozzle NL or the subsequent nozzle NF.

In the overlap region S, the grid points P which are the closest to the reverse main scanning direction are respectively specified as the non-ejection positions of the droplet D, and all other grid points P are specified as the ejection positions of the droplet D. Every other grid point P specified as the ejection position is provided with gradation along the sub scanning direction, and the preceding selected nozzles NLs and the subsequent selected nozzles NFs are alternately selected.

When the color filter substrate 6 is scanned in the main scanning direction, the preceding ejecting head 16L selects every other preceding selected nozzle NLs among the preceding nozzles NL corresponding to the overlap region S, and causes each preceding selected nozzle NLs to eject a preceding droplet. Each preceding droplet ejected from the preceding selected nozzle NLs strikes the region of the grid point P specified for each ejection pitch Py so as to form the belt-shaped liquid film LF extending in the scanning direction.

When the color filter substrate 6 is scanned in the main scanning direction, the subsequent ejecting head 16F selects, as the subsequent selected nozzle NFs, the subsequent nozzle NF which is not positioned on the scan path of the preceding selected nozzle NLs among the subsequent nozzles NF corresponding to the overlap region S, and causes each subsequent selected nozzle NFs to eject the subsequent droplet. The subsequent droplet ejected from the subsequent selected nozzle NFs strikes so as to compensate between the liquid films LF formed by the preceding selected nozzles NLs, causes each of the liquid films LF to gather together so as to form the liquid film LF over the entire overlap region S.

At this time, since the ejection timings are different between the preceding droplet and the subsequent droplet, a difference in film thickness (stripe unevenness) is formed at the boundary between the preceding oriented film and the subsequent oriented film. The preceding droplet and the subsequent droplet that have struck on the overlap region S disperse the stripe unevenness with regularity as a minute stripe unevenness for each ejection pitch Px, and draw a homogeneous stripe pattern on the entire overlap region S. As a result, the oriented film OF formed in the overlap region S is made consecutive when viewed as the entire oriented film OF, with the boundary between the preceding oriented film and the subsequent oriented film being made obscure. As a result, stripe unevenness between the preceding oriented film and the subsequent oriented film can be reduced.

An electrical configuration of the droplet ejecting device 10 as described above will now be below described, with reference to FIG. 8 and FIG. 9.

Figure 8:
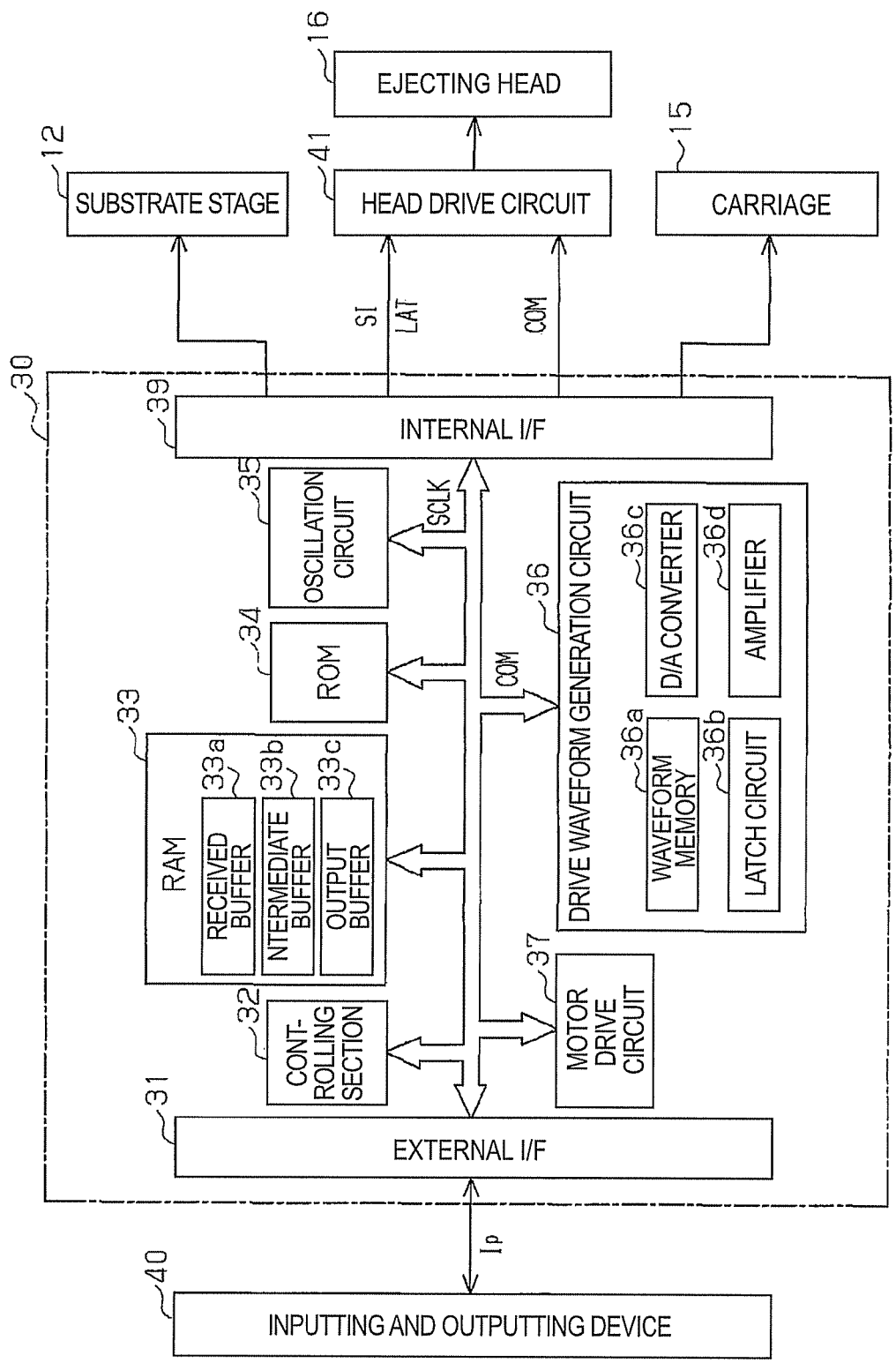
FIG. 8 is an electrical circuit block diagram showing an electrical configuration of the droplet ejecting device.
Figure 9:
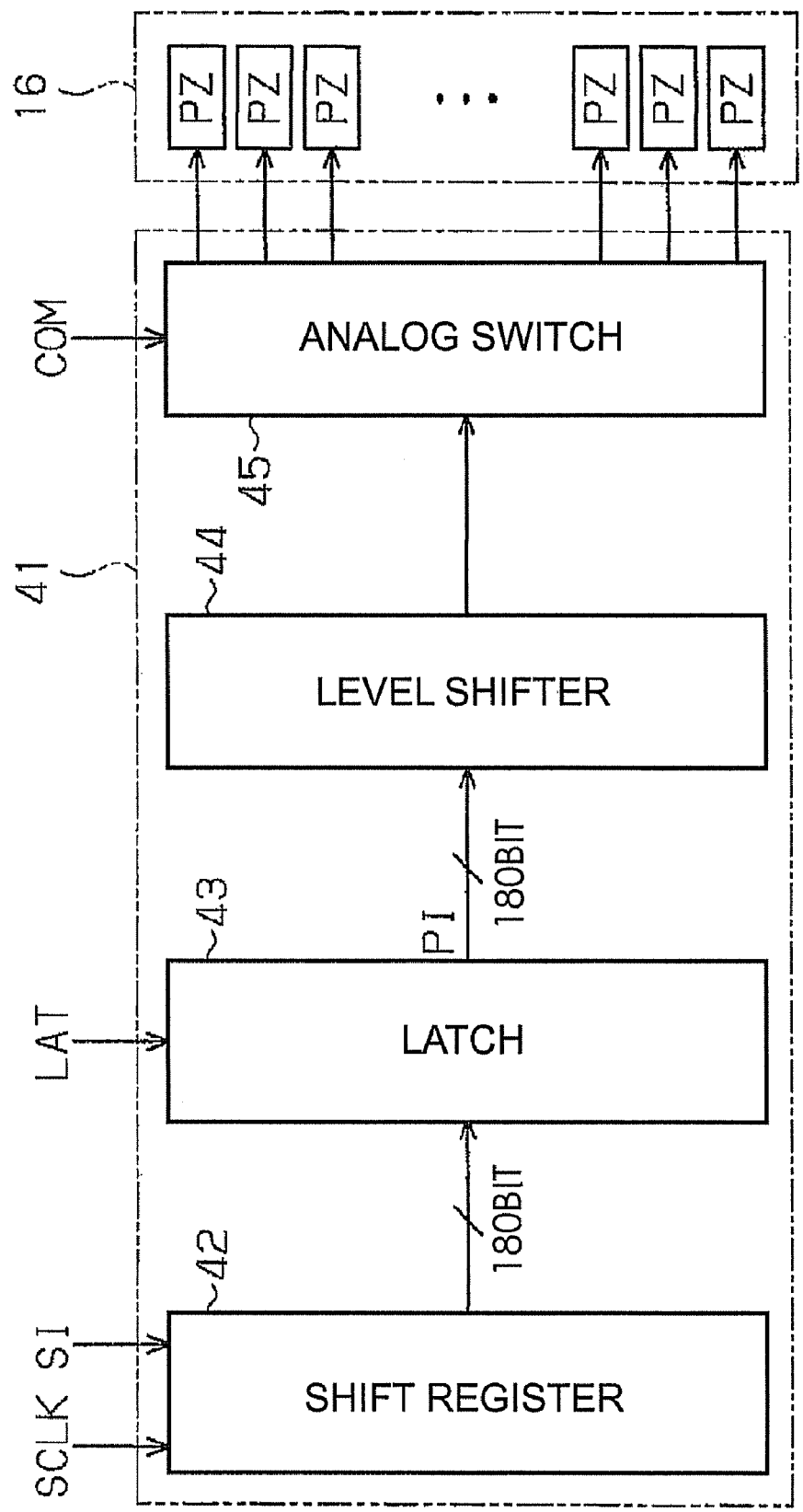
FIG. 9 is an electrical circuit block diagram showing a head drive circuit.

FIG. 8 is a circuit block diagram showing the electrical configuration of the droplet ejecting device 10, and FIG. 9 is a circuit block diagram showing the electrical configuration of the head drive circuit.

In FIG. 8, the controlling device 30 forming the control means causes the droplet ejecting device 10 to perform various process operations. The controlling device 30 includes an external I/F 31, a controlling section 32 composed of a central processing unit (CPU) and the like, a random access memory (RAM) 33 which includes a dynamic random access memory (DRAM) and a static random access memory (SRAM) and which stores various data, and a read only memory (ROM) 34 which stores various control programs. The controlling device 30 also includes an oscillation circuit 35 which generates a clock signal, a drive waveform generation circuit 36, a motor drive circuit 37 for scanning the substrate stage 12 and the carriage 15, and an internal I/F 39 which transmits various signals. The controlling device 30 is connected to the inputting and outputting device 40 via the external I/F 31, and is connected to the substrate stage 12 and the carriage 15 via the internal I/F 39. The controlling device 30 is also connected via the external I/F 31 to a head drive circuit 41 which is provided for each ejecting head 16 so as to form the control means.

The inputting and outputting device 40 is an external computer which includes, for example, a CPU, a RAM, a ROM, a hard disk, a liquid crystal display and the like. The inputting and outputting device 40 outputs various control signals for driving the droplet ejecting device 10 in accordance with a control program stored in the ROM or the hard disk to the external I/F 31. The external I/F 31 receives a drawing data Ip from the inputting and outputting device 40.

The drawing data Ip herein refers to various data for ejecting a droplet D such as data specifying whether or not to eject a droplet D for each grid point P of the dot pattern grid, data related to the preceding selected nozzle NLs and the subsequent selected nozzle NFs, information related to the scan rate of the substrate stage 12 or the like.

The RAM 33 is utilized as a received buffer 33a, an intermediate buffer 33b and an output buffer 33c. The ROM 34 stores various control routines that is performed by the controlling section 32 and various data for performing the control routines.

The oscillation circuit 35 generates a clock signal for synchronizing various data and various drive signals. The oscillation circuit 35 generates a transfer clock SCLK which is utilized, for example, when serially transferring various data. The oscillation circuit 35 generates a latch signal LAT for each ejection cycle. The latch signal LAT is utilized when serially transferred various data is converted to parallel.

The drive waveform generation circuit 36 includes a waveform memory 36a, a latch circuit 36b, a D/A converter 36c, and an amplifier 36d. The waveform memory 36a associates waveform data for generating various drive waveform signals COM (for example, a waveform signal for dark color COMA and waveform signal for light color COMB) to a predetermined address and stores them. The latch circuit 36b latches the waveform data which has been read out by the controlling section 32 from the waveform memory with a predetermined clock signal. The D/A converter 36c converts the waveform data which has been latched by the latch circuit 36b into an analog signal, and the amplifier 36d amplifies the analog signal which has been converted by the D/A converter 36c so as to generate the drive waveform signal COM.

When the inputting and outputting device 40 inputs the drawing data Ip, the controlling section 32 consults the drawing data Ip so as to read out the waveform data of the waveform memory 36a, and causes the drive waveform generation circuit 36 to generate the drive waveform signal COM.

The controlling section 32 outputs a drive control signal which corresponds to the motor drive circuit 37. In response to the drive control signal from the controlling section 32, the motor drive circuit 37 causes the internal I/F 39 to scan the substrate stage 12 and the carriage 15.

The controlling section 32 temporarily stores the drawing data Ip that the external I/F 31 received from the inputting and outputting device 40 in the received buffer 33a. The controlling section 32 converts the drawing data Ip into the intermediate code, and stores the data as the intermediate code data in the intermediate buffer 33b. The controlling section 32 reads out the intermediate code data from the intermediate buffer 33b, develops it to the dot pattern data, and stores the dot pattern data in the output buffer 33c. The dot pattern data is a data which is generated for each ejecting head 16, and in which whether or not to eject a droplet D to has been associated with each grid point P of the dot pattern grid.

After the controlling section 32 develops the dot pattern data which is equivalent to the amount of one scan of the substrate stage 12, it generates a serial data synchronized with the transfer clock SCLK utilizing the dot pattern data, and causes the internal I/F 39 to serial transfer the serial data to each head drive circuit 41.

Herein, the serial data which is generated utilizing the dot pattern data is referred to as the serial pattern data SI as a selection data. The serial pattern data SI has a bit value for specifying whether or not to eject of a dot for the amount equivalent to the number of the nozzles N, in other words, 180 nozzles, and is generated for each ejection cycle.

The head drive circuit 41 will now be described below.

In FIG. 9, the head drive circuit 41 includes a shift register 42, a latch 43, a level shifter 44 and an analog switch 45.

When the serial pattern data SI is serially transferred, the shift register 42 sequentially shifts the serial pattern data SI with the transfer clock SCLK, and stores the serial pattern data SI having 180 bits. When the latch signal LAT is inputted, the latch 43 latches the serial pattern data SI stored in the shift register 42, performs the serial-to-parallel conversion, and outputs it as the parallel pattern data PI.

The level shifter 44 receives the parallel pattern data PI outputted by the latch 43, increases the voltage of the parallel pattern data PI to the drive voltage level of the analog switch element, and outputs corresponding opening and closing signals which corresponds to the individual 180 piezoelectric elements PZ.

The analog switch 45 includes 180 switch elements that correspond to the individual piezoelectric elements PZ, and each switch element is opened and closed receiving the opening and closing signal which is outputted by the level shifter 44. The drive waveform signal COM is inputted to the input end of each of the switch elements, and the corresponding piezoelectric element PZ is connected to the output end of each of the switch elements. When the level shifter 44 outputs the opening and closing signal of the "H" level (high potential), each switch element outputs the drive waveform signal COM to the corresponding piezoelectric element PZ. On the other hand, when the level shifter 44 outputs the opening and closing signal of the "L" level (low potential), each switch element stops outputting the drive waveform signal COM.

As a result, the controlling device 30 causes each of the head drive circuits 41 to perform ejection process of the droplet D in accordance with each dot pattern data. In other words, the controlling device 30 causes the head drive circuit 41 corresponding to the preceding ejecting head 16L to select every other preceding selected nozzle NLs among the preceding nozzles NL corresponding to the overlap region S, and causes each of the preceding selected nozzles NLs to eject the preceding droplet. In addition, the controlling device 30 causes the head drive circuit 41 corresponding to the subsequent ejecting head 16F to select as the subsequent selected nozzle NFs the subsequent nozzle NF which is not positioned on the scan path of the preceding selected nozzle NLs among the subsequent nozzles NF corresponding to the overlap region S, and causes each of the subsequent selected nozzles NFs to eject the subsequent droplet.

The method of forming the oriented film OF using the droplet ejecting device 10 will now be described below.

First, as shown in FIG. 3, the color filter substrate 6 is placed on the substrate stage 12 in the state where the ejection surface 6a thereof faces upwards. At this time, the substrate stage 12 disposes the color filter substrate 6 in the reverse main scanning direction of the carriage 15. In this state, the inputting and outputting device 40 inputs the drawing data Ip to the controlling device 30.

The controlling device 30 causes the motor drive circuit 37 to scan the carriage 15, and disposes the carriage 15 so that each of the ejecting heads 16 passes on the color filter substrate 6 when the color filter substrate 6 is scanned in the main scanning direction. After having disposed the carriage 15, the controlling device 30 causes the motor drive circuit 37 to start scanning the substrate stage 12.

The controlling device 30 develops the drawing data Ip which has been inputted from the inputting and outputting device 40 to the dot pattern data. At this time, the controlling device 30 generates the dot pattern data for each grid point P of the overlap region S. In the dot pattern data, the preceding selected nozzles NLs and the subsequent selected nozzles NFs are alternately selected along the sub scanning direction. The controlling device 30 generates a dot pattern data for each grid point P on the ejection surface 6a excluding the overlap region S. In the dot pattern data, the corresponding preceding nozzle NL or the corresponding subsequent nozzle NF are consecutively selected along the sub scanning direction.

After the controlling device 30 develops the dot pattern data which is equivalent to the amount of one scan of the substrate stage 12, it generates a serial data synchronized with the transfer clock SCLK utilizing the dot pattern data, and serially transfers it to each head drive circuit 41.

Next, when the grid point P positioned closest to the main scanning direction has reached directly below the preceding nozzle NL, the controlling device 30 outputs the latch signal LAT and the drive waveform signal COM synchronized with the latch signal LAT for each ejection cycle. The controlling device 30 causes each of the head drive circuits 41 to serial-to-parallel convert the serial pattern data SI transferred for each ejection cycle and generates the opening and closing signal for opening and closing each switch element.

In accordance with the opening and closing signal, the controlling device 30 causes each of the preceding selected nozzles NLs to eject the droplet D. Every other preceding selected nozzle NLs has been selected among the preceding nozzles NL corresponding to the overlap region S. In addition, the controlling device 30, in accordance with the opening and closing signal, selects the subsequent selected nozzle NFs and cause it to eject the droplet D. Specifically, the controlling device 30 selects as the subsequent selected nozzle NFs each subsequent nozzle NF which is not positioned on the scan path of each preceding selected nozzle NLs among the subsequent nozzles NF corresponding to the overlap region S, and causes each subsequent selected nozzle NFs to eject the droplet D.

As a result, the controlling device 30 is capable of providing minute stripe unevenness for each ejection pitch Px on the oriented film OF of the overlap region S, and reduces stripe unevenness between the preceding oriented film and the subsequent oriented film of the entire oriented film OF.

Advantageous effects according to First Embodiment configured as described above will now be described.

(1) According to the embodiment as described above, one side of the nozzle line NR composed of the preceding nozzles NL arrayed in the sub scanning direction and the other side of the nozzle line NR composed of the subsequent nozzles NF arrayed in the sub scanning direction are disposed such as to overlap when viewed from the main scanning direction. Next, when ejecting the droplet D toward the color filter substrate 6 scanned in the main scanning direction, a plurality of the preceding nozzles NL are selected among the preceding nozzles NL corresponding to the overlap region S, and a preceding droplet is ejected to each of the selected preceding nozzles NL. In addition, a plurality of the subsequent nozzles NF are selected which are positioned between the selected plurality of preceding nozzles NLs when viewed from the main scanning direction, and the subsequent droplet is ejected in each of the selected subsequent nozzles NF.

Therefore, the oriented films OF which are formed at different timings can be repeatedly disposed in the sub scanning direction of the overlap region S. As a result, the boundary of the oriented films OF which are formed at different timings can be dispersed in the overlap region S, and the entire oriented film OF can be formed consecutively.

(2) According to the embodiment as described above, every other preceding nozzle NL corresponding to the overlap region S is selected to eject a preceding droplet, and each of the subsequent nozzles NF which is positioned between the selected preceding nozzles NL is selected to eject the subsequent droplet. Therefore, the oriented films OF which are formed at different timings can be disposed repeatedly and regularly at the minimum interval, that is, at the ejection pitch Px along the sub scanning direction of the overlap region S. As a result, the oriented films OF can be formed consecutively with more certainty.

Second Embodiment

Second Embodiment of the invention will now be below described, with reference to FIG. 10. In Second Embodiment, the dot pattern of First Embodiment has been changed. Accordingly, hereinafter, the change will be described in detail. Note that, among the grid points P shown in FIG. 10, each of the grid points P specified as the ejection position is surrounded by a square frame (referred to, hereinafter, as simply a the ejection frame F). The nozzles N selected by the ejection frame F with gradation are indicated with a similar gradation, and the nozzles N selected by the ejection frame F on a colored background are indicated on a colored background in a similar manner. In addition, the nozzles N for which the ejection operation has been selected are indicated by a solid line, and the nozzles N for which the ejection operation has not been selected are indicated by a dotted line.

Figure 10:
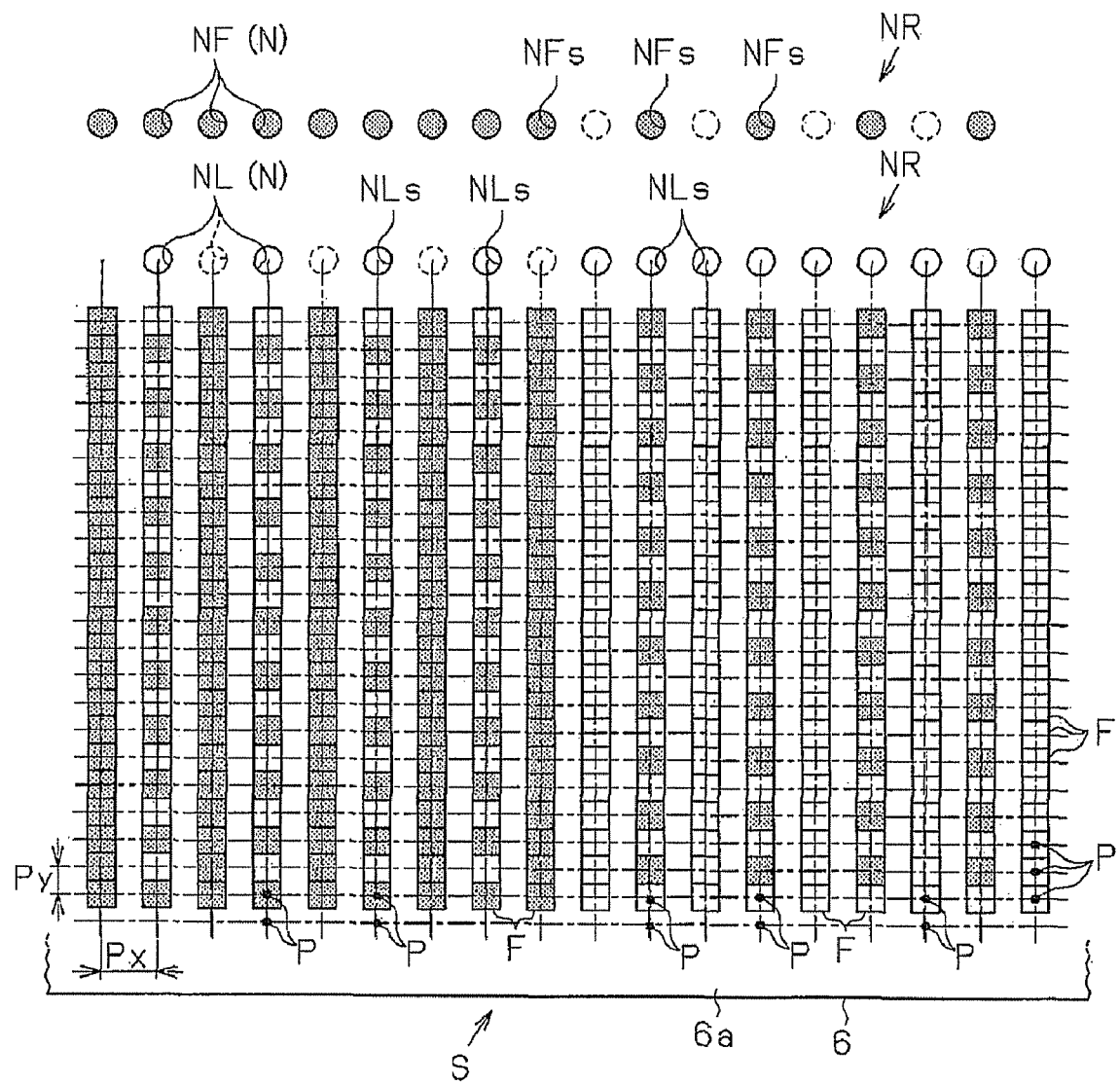
FIG. 10 is a plan view schematically showing a positional relationship between the ejection positions and the nozzles according to Second Embodiment.

As shown in FIG. 10, on the left side of the overlap region S, the grid points P specified as the ejection positions alternately include, along the sub scanning direction, a plurality of the grid points P with gradation along the main scanning direction and a plurality of the grid points P every other which is provided with gradation along the main scanning direction. In addition, on the right side of the overlap region S, the grid points P specified as the ejection positions alternately include along the sub scanning direction a plurality of the grid points P on a colored background along the main scanning direction and a plurality of the grid points P every other which is provided with gradation along the main scanning direction.

The controlling device 30 generates the dot pattern data corresponding to the dot pattern shown in FIG. 10 and the serial pattern data SI corresponding to the dot pattern data, and causes each of the head drive circuits 41 to selectively eject the preceding droplet and the subsequent droplet. Next, the controlling device 30 draws a block check (checkered pattern) of the preceding droplets with the subsequent droplets as the back ground on the left side of the overlap region S, and draws a block check of the subsequent droplets with the preceding droplets as the background on the right side of the overlap region S.

This configuration enables drawing the block check of the subsequent droplets with the preceding droplets as the background consecutively starting from the preceding oriented film, and enables drawing the block check of the preceding droplets with the subsequent droplets as the background consecutively starting from the subsequent oriented film. In addition, this configuration enables connecting the block check of the subsequent droplets with the preceding droplets as the background and the block check of preceding droplets with the subsequent droplets as the background at the substantial center along the sub scanning direction of the overlap region S.

Therefore, the oriented films OF formed in the overlap region S enable the boundary between the preceding oriented film and the subsequent oriented film to be formed of minute stripe unevenness along the main scanning direction and the sub scanning direction. As a result, the boundary between the preceding oriented film and the subsequent oriented film can be formed more consecutively.

Third Embodiment

Third Embodiment of the invention will now be below described, with reference to FIG. 11. In Third Embodiment, the dot pattern of First Embodiment has been changed. Accordingly, hereinafter, the change will be described in detail. Note that, among the grid points P shown in FIG. 11, each of the grid points P specified as the ejection position is surrounded by a square frame (referred to, hereinafter, as simply a the ejection frame F). The nozzles N selected by the ejection frame F with gradation are indicated with a similar gradation, and the nozzles N selected by the ejection frame F on a colored background are indicated on a colored background in a similar manner. In addition, the nozzles N for which the ejection operation has been selected are indicated by a solid line, and the nozzles N for which the ejection operation has not been selected are indicated by a dotted line.

Figure 11:
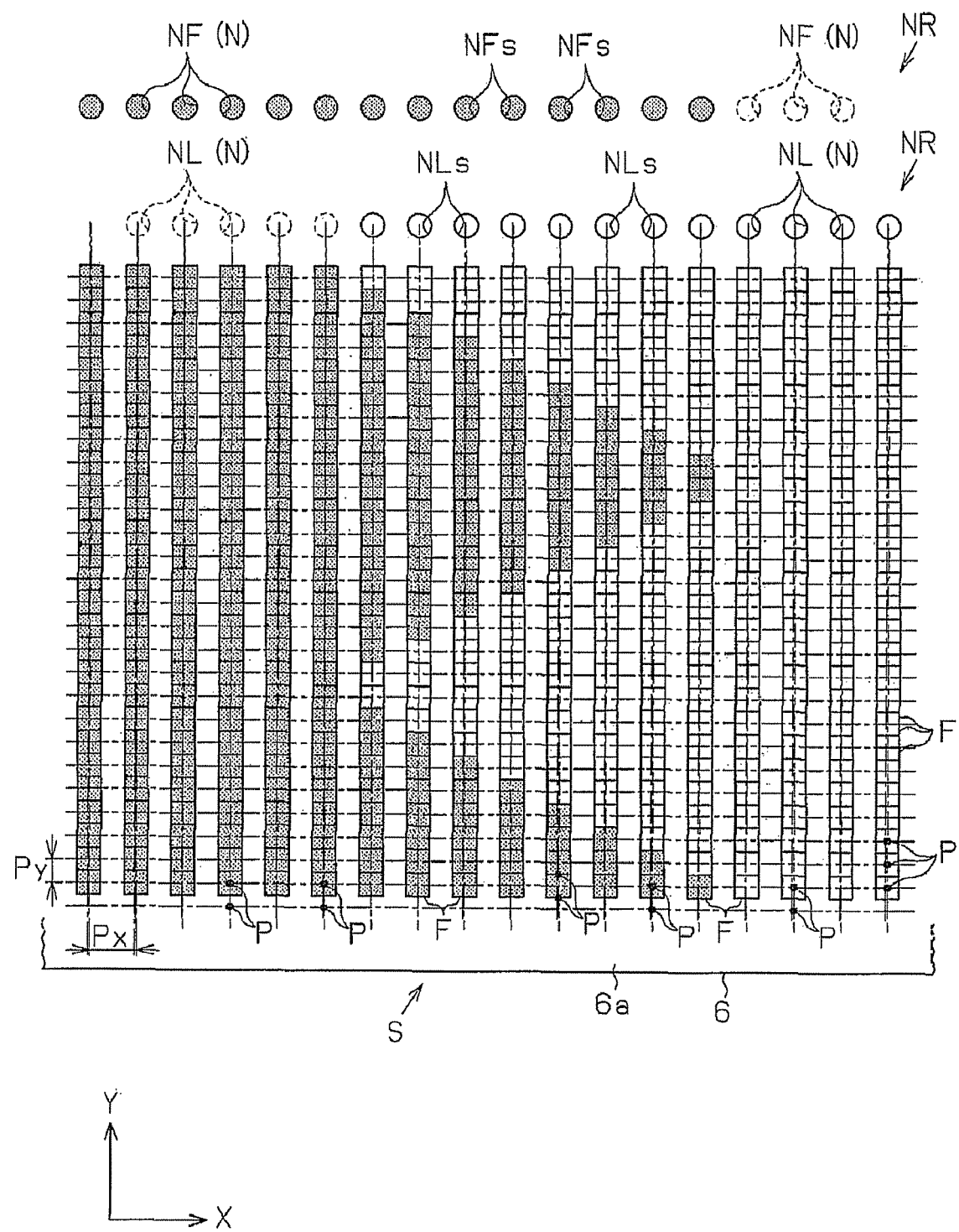
FIG. 11 is a plan view schematically showing a positional relationship between the ejection positions and the nozzles according to Third Embodiment.

As shown in FIG. 11, on the left side of the overlap region S, the plurality of the grid points P which are consecutive in the sub scanning direction are respectively specified as the ejection positions of the subsequent nozzle NF. In addition, on the right side of the overlap region S, the plurality of the grid points P which are consecutive in the reverse sub scanning direction are respectively specified as the ejection positions of the preceding nozzle NL.

Among the grid points P specified as the ejection positions of the subsequent nozzle NF, the grid point P which is positioned closest to the sub scanning direction is displaced in the sub scanning direction by the amount equivalent to the ejection pitch Px for each ejection pitch Py, and draws a serrated trajectory which is consecutive in the main scanning direction.

The controlling device 30 generates the dot pattern data corresponding to the dot pattern shown in FIG. 11 and the serial pattern data SI corresponding to the dot pattern data, and causes each of the head drive circuits 41 to selectively eject the preceding droplet and the subsequent droplet. Next, the controlling device 30 draws the boundary between the subsequent droplet to be ejected to the left side of the overlap region S and the preceding droplet to be ejected to the right side of the overlap region S in a consecutive serrated shape in the main scanning direction.

According to the configuration, the oriented films OF formed in the overlap region S enable the boundary between the preceding oriented film and the subsequent oriented film to be formed by serrated minute stripe unevenness along the main scanning direction, that is, by minute stripe unevenness in a direction which intersects with the main scanning direction and in a direction which intersects with the sub scanning direction. As a result, the boundary between the preceding oriented film and the subsequent oriented film can be formed more consecutively.

Following changes can be made to the embodiments as described above.

According to First Embodiment as described above, it is configured such that every other preceding selected nozzle NLs is selected along the sub scanning direction. However, the configuration is not limited thereto and, for example, the preceding selected nozzle NLs may be selected, for example, every two or more preceding nozzle NL along the sub scanning direction. Further, the preceding selected nozzles NLs may be selected non-cyclically.

According to Second Embodiment as described above, it is configured such that the preceding selected nozzles NLs and the subsequent selected nozzles NFs are alternately selected along the main scanning direction for each grid point P. However, the configuration is not limited thereto. For example, the preceding selected nozzles NLs and the subsequent selected nozzles NFs may be alternately selected non-cyclically.

Figure 12:
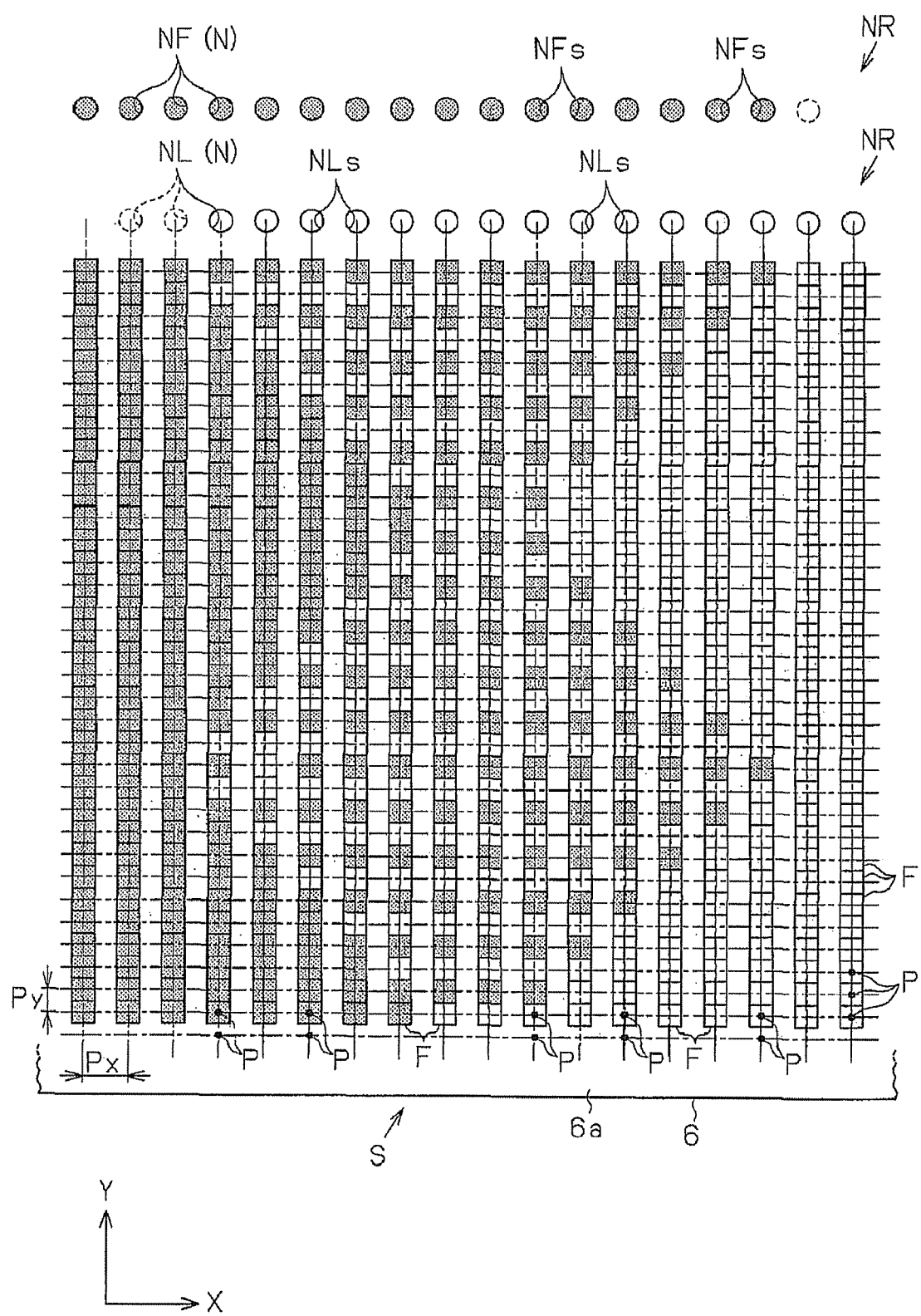
FIG. 12 is a plan view schematically showing a positional relationship between the ejection positions and the nozzles according to a modification.

According to Third Embodiment as described above, it is configured such that the boundary between the preceding oriented film and the subsequent oriented film is formed into a serrated shape along the main scanning direction by the preceding selected nozzles NLs consecutive in the sub scanning direction and the subsequent selected nozzles NFs consecutive in the sub scanning direction. However, the configuration is not limited thereto. For example, as shown in FIG. 12, the boundary between the subsequent droplet ejected to the left side of the overlap region S and the preceding droplet ejected to the right side of the overlap region S may be formed into a serrated shape consecutive in the main scanning direction, and each of the saw teeth may be formed of comb-teeth extending in the sub scanning direction. In other words, the configuration may be such that the boundary between the preceding droplet and the subsequent droplet is formed by comb-teeth with gradation extending in the sub scanning direction and comb-teeth on a colored background which meshes with the same comb-teeth as shown in FIG. 12.

This configuration enables the formation direction of minute stripe unevenness in the overlap region S to be dispersed into multiple directions including the sub scanning direction. Therefore, the oriented films OF formed in the overlap region S enable the boundary between the preceding oriented film and the subsequent oriented film to be more consecutive.

At this time, the controlling device 30 generates the dot pattern data corresponding to the dot pattern in FIG. 12 and the serial pattern data SI corresponding to the dot pattern data, and causes each of the head drive circuits 41 to selectively eject the preceding droplet and the subsequent droplet.

Figure 13:
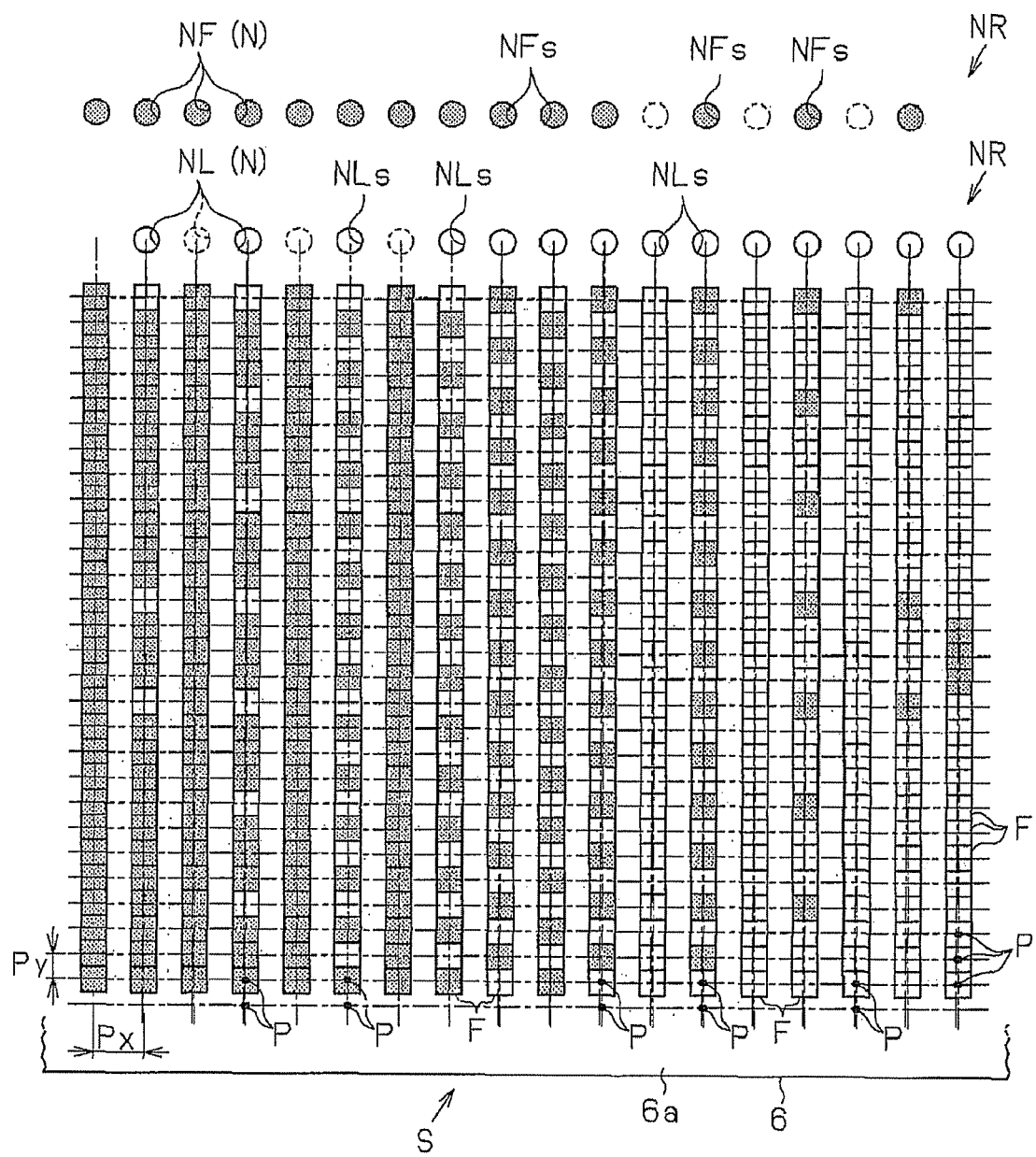
FIG. 13 is a plan view schematically showing a positional relationship between the ejection positions and the nozzles according to a modification.

In addition, as shown in FIG. 13, configuration may be such that each of the comb-teeth in FIG. 12 is divided by a stripe pattern shown in FIG. 10.

This configuration enables the formation direction of minute stripe unevenness in the overlap region S to be dispersed into the main scan direction and the sub scanning direction. Therefore, the oriented films OF formed in the overlap region S enable the boundary between the preceding oriented film and the subsequent oriented film to be consecutive. Accordingly, stripe unevenness between the preceding oriented film and the subsequent oriented film can be resolved with more certainty.

At this time, the controlling device 30 generates the dot pattern data corresponding to the dot pattern in FIG. 13 and the serial pattern data SI corresponding to the dot pattern data, and causes each of the head drive circuits 41 to selectively eject the preceding droplet and the subsequent droplet.

According to the embodiments as described above, it is configured such that the controlling section 32 generates the dot pattern data using the drawing data Ip. However, the configuration is not limited thereto. For example, the configuration may be such that the inputting and outputting device 40 generates the dot pattern data using the drawing data Ip, and the inputting and outputting device 40 inputs the dot pattern data to the controlling device 30.

According to the embodiments as described above, the actuator for ejecting the droplet D has been embodied to the piezoelectric element PZ. However, the configuration is not limited thereto. For example, the actuator may be embodied into a resistance heating element, and any actuator is accepted as long as it receives a predetermined drive waveform signal COM and ejects the droplet D of a weight corresponding to the drive waveform signal COM.

According to the embodiments as described above, it is configured such that each of the ejecting heads 16 includes only a single line of 180 nozzles N. However, the configuration is not limited thereto. For example, the configuration may be such that each of the ejecting heads 16 includes two or more lines of 180 nozzles N. Alternatively, the number of the nozzles in a single line may be more than 180.

According to the embodiments as described above, the electro-optic device is embodied into the liquid crystal display device 1, and the oriented films OF are produced by the droplet D. However, the configuration is not limited to this. For example, the color filter CF of the liquid crystal display device 1 may be produced by the droplet D. In addition, the electro-optic device may be embodied into an electro-luminescence display device, and light-emitting elements are produced by a droplet D containing a light-emitting element.

The entire disclosure of Japanese Patent Application No. 2007-5463, filed Jan. 15, 2007 is expressly incorporated by reference herein.

What is claimed is:

1. A pattern forming method comprising:
disposing a portion of a first nozzle group composed of a plurality of first nozzles arranged in a first direction and a portion of a second nozzle group composed of a plurality of second nozzles arranged in the first direction so as to overlap each other as viewed in a second direction; and
ejecting a droplet from each of a plurality of selected nozzles of the first nozzles and a plurality of selected nozzles of the second nozzles to a substrate that moves in the second direction relative to the first nozzles and the second nozzles to form a pattern on the substrate,
wherein a droplet is ejected from each of a plurality of the first nozzles selected in an area of the first nozzle group overlapped with the second nozzle group as viewed in the second direction and each of the plurality of second nozzles located between each adjacent pair of the selected first nozzles as viewed in the second direction is selected to eject a droplet.

2. The pattern forming method according to claim 1, wherein a droplet is ejected from a plurality of the first nozzles selected in accordance with a predetermined interval in the area of the first nozzle group overlapped with the second nozzle group as viewed in the second direction, and a plurality of the second nozzles located between each adjacent pair of the selected first nozzles as viewed in the second direction is selected to eject a droplet.

3. The pattern forming method according to claim 1, wherein at least a pair of a first nozzle and a second nozzle that overlap each other as viewed in the second direction is alternately selected to eject a droplet.

4. The pattern forming method according to claim 1, wherein a foremost position in the first direction of the first nozzles selected in the area of the first nozzle group overlapped with the second nozzle group as viewed in the second direction is shifted at a predetermined cycle.

5. A pattern forming method, comprising:
disposing a portion of a first nozzle group composed of a plurality of first nozzles arranged in a first direction and a portion of a second nozzle group composed of a plurality of second nozzles arranged in the first direction so as to overlap each other as viewed in a second direction; and ejecting a droplet from each of a plurality of selected nozzles of the first nozzles and a plurality of selected nozzles of the second nozzles to a substrate that moves in the second direction relative to the first nozzles and the second nozzles to form a pattern on the substrate, wherein at least a pair of a first nozzle and a second nozzle that overlap each other as viewed in the second direction is alternately selected to eject a droplet.

6. The pattern forming method according to claim 5, wherein at least a pair of a first nozzle and a second nozzle that overlap each other as viewed in the second direction is alternately selected at a predetermined cycle to eject a droplet.

7. The pattern forming method according to claim 5, wherein consecutive nozzles of the first nozzles arranged in the first direction in the area of the first nozzle group overlapped with the second nozzle group as viewed in the second direction, and consecutive nozzles of the second nozzles arranged in the first direction in the area of the second nozzle group overlapped with the first nozzle group as viewed in the second direction are alternately selected at a predetermined cycle to eject a droplet.

8. The pattern forming method according to claim 5, wherein a foremost position in the first direction of the first nozzles selected in the area of the first nozzle group overlapped with the second nozzle group as viewed in the second is shifted at a predetermined cycle.

9. A droplet ejecting device, comprising:
a head unit including a first nozzle group composed of a plurality of first nozzles arranged in a first direction and a second nozzle group composed of a plurality of second nozzles arranged in the first direction, wherein a portion of the first nozzle group and a portion of the second nozzle group are disposed so as to overlap each other as viewed in a second direction, a moving unit that relatively moves the head unit and a substrate in the second direction; and a control unit that selects a plurality of nozzles of the first nozzles in an area of the first nozzle group overlapped with the second nozzle group as viewed in the second direction, produces selection data for selecting the second nozzles located between each adjacent pair of the selected first nozzles as viewed in the second direction, and selectively drives each of the first nozzles and the second nozzles based on the selection data to eject a droplet to the substrate.

10. An electro-optical device, comprising:
an oriented film on a side surface of a substrate, wherein the oriented film is formed by the droplet ejecting device according to claim 9.

11. A droplet ejecting device, comprising:
a head unit including a first nozzle group composed of a plurality of first nozzles arranged in a first direction and a second nozzle group composed of a plurality of second nozzles arranged in the first direction, wherein a portion of the first nozzle group and a portion of the second nozzle group are disposed so as to overlap each other as viewed in a second direction, a moving unit that relatively moves the head unit and a substrate in the second direction; and a control unit that produces selection data for alternately selecting at least a pair of a first nozzle and a second nozzle that overlap each other as viewed in the second direction, and selectively drives each of the first nozzles and the second nozzles based on the selection data to eject a droplet to the substrate.

* * * * *